(No Model.) 2 Sheets—Sheet 2.

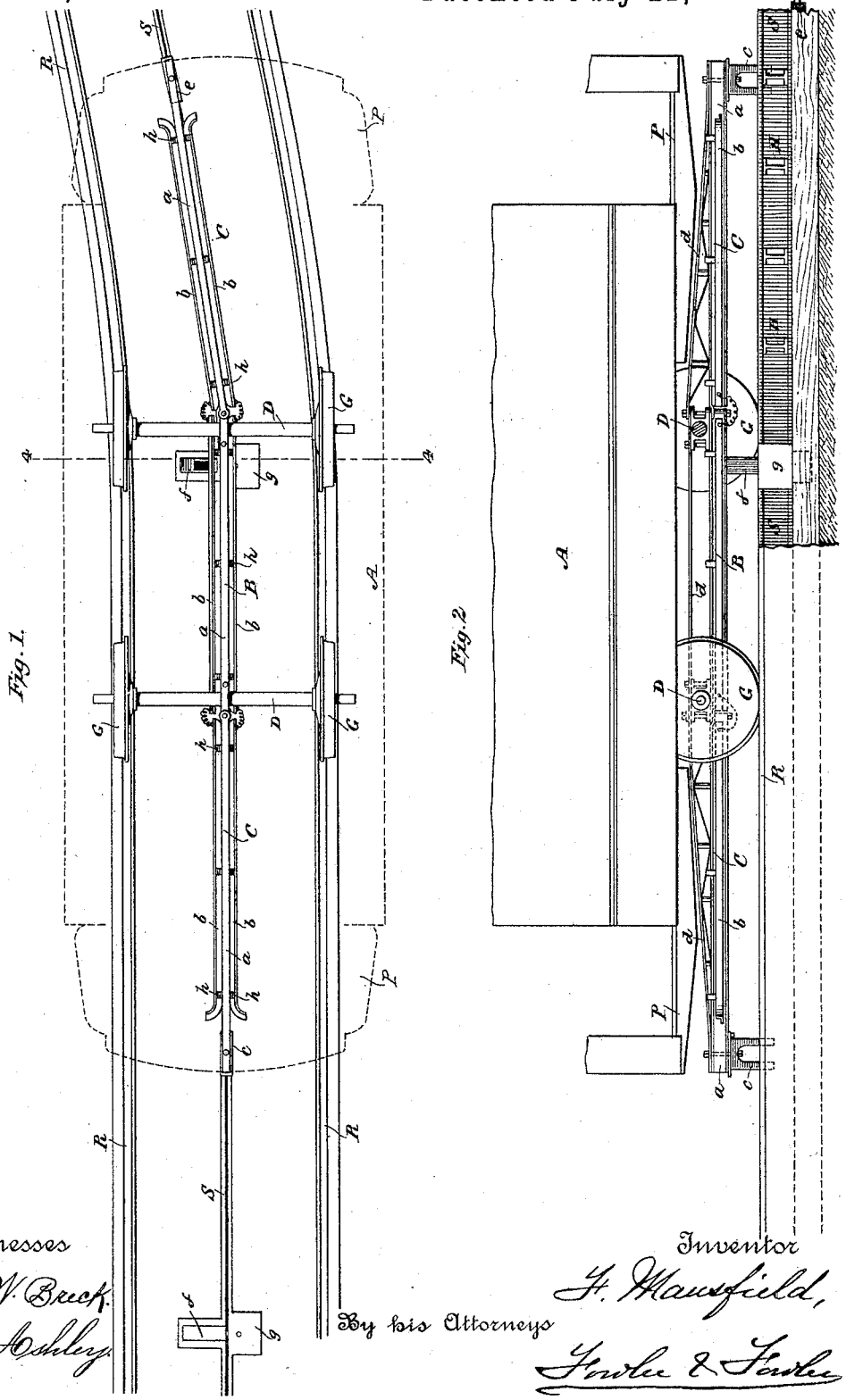

F. MANSFIELD.
ELECTRICAL RAILWAY.

No. 432,675. Patented July 22, 1890.

Witnesses
Geo. W. Breck
C. E. Ashley

Inventor
F. Mansfield,
By his Attorneys
Fowler & Fowler

UNITED STATES PATENT OFFICE.

FRANK MANSFIELD, OF NEW YORK, N. Y.

ELECTRICAL RAILWAY.

SPECIFICATION forming part of Letters Patent No. 432,675, dated July 22, 1890.

Application filed June 17, 1887. Renewed February 9, 1889. Again renewed April 12, 1890. Serial No. 347,594. (No model.)

*To all whom it may concern:*

Be it known that I, FRANK MANSFIELD, a citizen of the United States, residing at New York, in the county of New York and State of New York, have invented certain new and useful Improvements in Electrical Railways, of which the following is such a full, clear, and exact description as will enable any one skilled in the art to which it appertains to make and use the same, reference being had to the accompanying drawings, forming part of this specification.

My invention relates to the class of electrical railways having a plow extending into the slot of a conduit controlling the circuit to the motor on the car.

The object of the invention is to secure an electrical railway which will not be interfered with by water. In electrical railways of the subterranean-conduit type, in which conduit conductors are placed and contact made therewith beneath the surface of the ground, water in time of rains and floods is apt to enter the conduit and short-circuit the current, thus rendering the railway more or less useless for the time being. My invention is designed to overcome this, and has for its object to construct an electrical railway of the above type so that the current cannot be short-circuited by any such means. I accomplish this by completely insulating the underground conductor throughout its length and having its live and exposed portion make contact with the circuit-completing devices on the car above the surface of the ground, so that whether the surface of the ground be covered with water or not the operation of the system is not interfered with. I attain these results by the devices illustrated in the accompanying drawings, embodying the invention, which consists, briefly, in an insulated conductor having normally-disconnected insulated branches extending therefrom at intervals along the way, with a device at said branches adapted to be struck by a pick-up on the passing car to connect said branches to the main conductor and raise their exposed ends above the surfaces of the ground to make contact with the circuit-completing devices on the car. As the car progresses, the branches are successively picked up along the way and the previous ones dropped, the former taking place before the latter, so as to keep the circuit intact.

Figure 3:
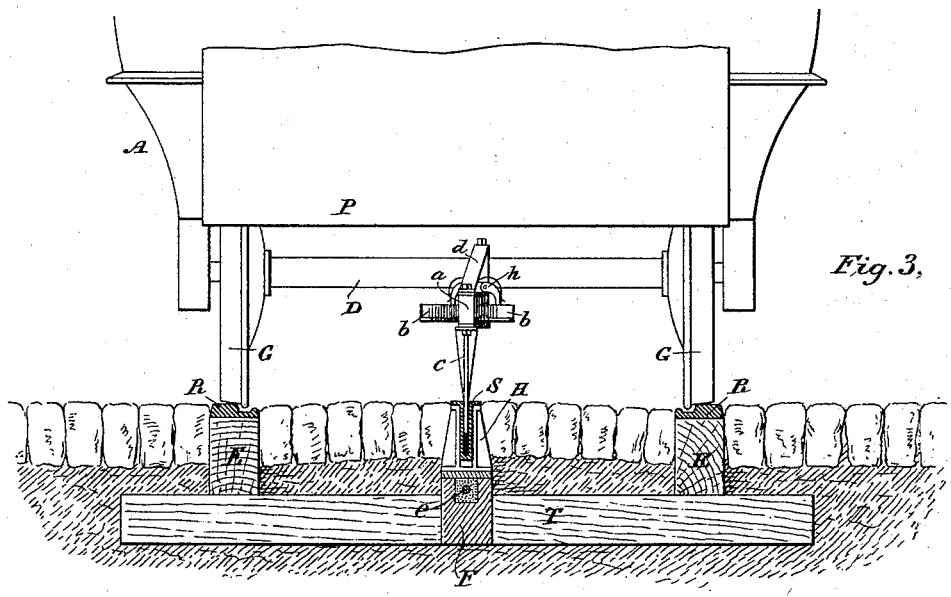
Figure 4:
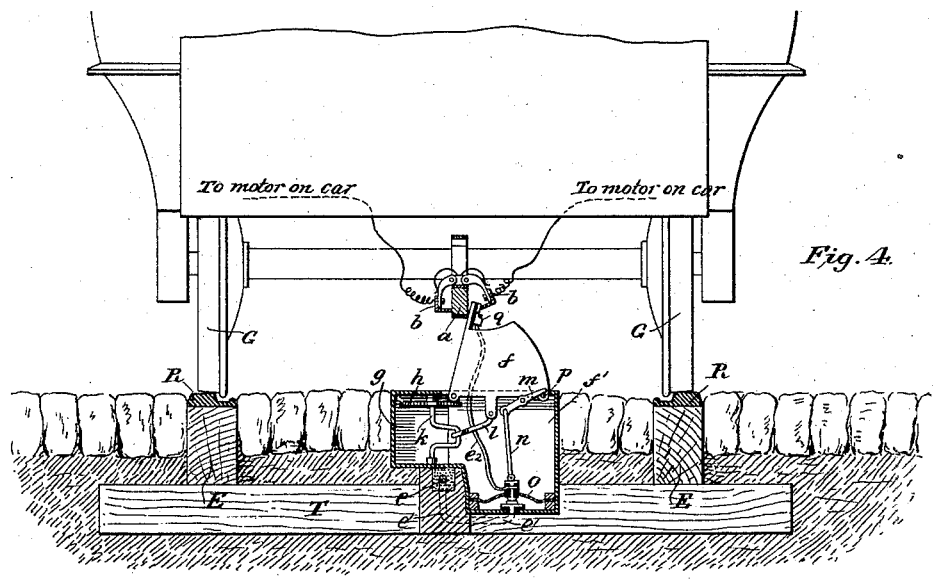
Figure 5:
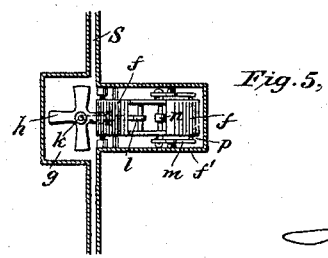

In the accompanying drawings, forming a part of this specification, Figure 1 is a plan view of devices embodying my invention, the body of the car being shown in dotted lines only; Fig. 2, a side view thereof, partly sectioned; Fig. 3, an end view thereof; Fig. 4, a section thereof on line 4 4 of Fig. 1, and Fig. 5 a plan of the devices for controlling the circuit.

The same letters of reference indicate the same parts throughout the various figures.

A designates the body of the car. Supported underneath thereof from the axles D D, carried by the wheels G of the car, is a bar B, having hinged to it two similar bars C C, sustained by trussing $d$ from the axles. The bars C C are free to swing, so that the car can easily go around a curve, as shown in Fig. 1. The bars B, C, and C are composed of a central part $a$, preferably of wood, (see particularly Figs. 1 and 4,) to each side of which is pivoted angle-irons $b$, Fig. 4, by hinges $h$. The outer ends of said angle-irons $b$ are made flaring, as shown in Figs. 1 and 3. The hinges $h$ are provided with springs, which cause the angle-irons $b$ to normally bear upon the part $a$. Depending from each end of the bar $a$ is a pick-up $c$, the purpose of which will be described hereinafter. The pivoted bars C B C are made equal in length to the car and the platforms P, so that they may be arranged entirely out of the way.

R R designate the ordinary rails of a track resting upon sleepers E E, bearing upon crossties T beneath the paving. A stringer F is provided midway of the sleepers E E, upon which the irons H rest, having a slot S, in which the pick-ups $c$ are adapted to travel. The stringer F may be chambered to receive the conductor $e$, which is insulated throughout its length. At intervals along the way, not greater apart than the length of the pivoted bars C B C, are arranged boxes $f\ g$, flush with the surface of the road. At these boxes the conductor $e$ is provided with branch conductors $e'$ $e^2$, normally separated from each other.

Within the boxes $g$ is arranged an operating device or turnstile $h$ in the path of the slot S. The turnstile has a crank $k$, (see Fig. 4,) that is connected by a link $l$ to the cover of the box $f$, which is pivoted so that the same may be raised and lowered by the mechanism just described when the turnstile is struck by the pick-ups $c$ traveling in said slot. The cover $f$ is provided with an insulated conducting-plate $q$, adapted to make contact with and slide along the angle-irons $b$, and so complete the circuit to the car. The insulated plate $q$ is connected with the exposed end of one of the branch conductors $e^2$. These conductors $e'$ and $e^2$ are covered with insulating material. The latter $e^2$ is affixed to but insulated from an elastic water-tight drum-head $o$ in a suitable manner. The branch conductor $e'$ terminates in a conducting-piece within the interior of the drum, but is insulated therefrom. Normally the terminals of the branch conductors $e'$ and $e^2$ within the drum stand apart, the elasticity of the drum holding the terminal of $e^2$ away from the terminal of $e'$. Connected to this drum $o$ is a link $n$, pivotally secured to a lever $m$ swiveled to the side of the box $f$, and adapted to be operated by a pin $p$ upon an extension of the cover when said cover reaches its highest point. When the turnstile is operated by the first pick-up, the cover or lid $f$ will be thrown upward and caught by the flaring end of one of the angle-irons $b$, and will run along the angle-iron until the end is reached, when the turnstile will again be struck by the second pick-up and lid closed. These operations cause the circuit to be made and broken between the conductors $e'$ and $e^2$. When the cover reaches the limit of its upward excursion, the pin $p$ impinges against the lever $m$, forcing the link $n$ downward, depressing the drum-head and forcing the conductors $e'$ and $e^2$ in intimate contact, thus completing the circuit from $e$ to $e'$ and $e^2$ to the angle-irons $b$ and car, from whence the current may pass to the rails or to any return-conductor back to the source of electricity. Before this lid is disengaged by the angle-irons another is picked up, after which the turnstile is struck by the second pick-up $c$, and the first-mentioned cover closed, and so on, disrupting the circuit between $e'$ and $e^2$ at said cover, as the tension is by this means removed from the drum-head $o$. The distance between the pick-ups $c$ should be a little greater than the distance between the boxes, so that the continuity of the circuit may never be lost and sparking prevented. It will be observed that the pick-ups $c$ are some distance from the flaring ends of the angle-irons $b$, so that the covers can be actuated by the pick-ups without the interference of the angle-irons. The cover $f$ and plate $q$ ride along one side of the bar $a$ when a car goes and returns on the same track, and on the other side of the bar $a$ when the car travels on a return-track, making contact with the angle-irons on one side or on the other side of said bar, as the case may be.

It will be obvious that the circuit between the branch conductors $e'$ and $e^2$ may be completed in various other ways by the operation of the cover $f$ without departing from my invention. It will be obvious, too, that other means may be employed to operate the turnstile and complete the circuit to the car and still be within my invention. Other devices may also be substituted for the turnstile and its connecting mechanism. I do not wish, therefore, to limit myself to the specific means described, as I have only shown the above as one form of devices embodying my invention. The lids of the boxes could also be arranged to fall by gravity when disengaged, and one of the pick-ups dispensed with, if desired. The drum-head $o$ being water-tight and the conductor thoroughly protected at every point, no chance for short-circuiting by water in the conduit or over the surface of the way can occur, unless the same is a foot or two deep, as the only exposed live point of the conductors is by my method raised this distance above the surface of the roadway. Such a conduit as I have described being but a mere slot can be easily laid and cheaply manufactured. The main conductor could be arranged to one side of the way, if desired, and the branch conductors emanate therefrom. It will be noted that the branch conductors are not made alive until the lid bearing the contact-plate reaches its maximum height above the ground, and that the said conductors are dead as soon as the covers begin to fall, so that there is no chance for the current to be short circuited by water unless the same be a foot or two deep over the surface of the ground.

Having now fully described my invention, what I desire to claim and secure by Letters Patent of the United States is—

1. In an electrical railway, the combination of a pick-up on a car, a main conductor insulated at all points throughout its length, with normally-disconnected branch conductors extending therefrom covered with insulating material, but having an exposed end, and mechanism operated by said pick-up for raising the exposed end of said branch conductors in contact with circuit-completing devices on the car.

2. An electrical railway having its conductor insulated throughout, circuit-completing devices carried by a car, normally-disconnected branch conductors at intervals along the way also insulated throughout, and a pick-up on said car for raising said branch conductors in contact with said circuit-completing devices on the car.

3. The combination, in an electrical railway, of a main conductor insulated at all points, normally-disconnected branch conductors extending therefrom at intervals along the way, a pick-up on a car, and a turnstile at said branch conductors operated thereby to complete the circuit of said branch conductors and raise the same above the level of the way in contact with circuit-completing devices on said car.

4. The combination, in an electrical railway, of an underground conductor for conveying the current of electricity, insulated at all points throughout its length, normally-disconnected branch conductors along the way, a turnstile at intervals along the way for raising said branch conductors above the surface of the ground and putting their exposed live ends in contact with circuit-completing devices on the car, and a pick-up on the car for actuating said turnstile.

5. The combination, in an electrical railway, of an insulated conductor $e$, insulated normally-disconnected branch conductors $e'$ $e^2$, extending therefrom at intervals along the way, a water-tight drum or other means housing the exposed terminals thereof, circuit-completing devices on the car above the level of the way, mechanism at said branch conductors for connecting them together and raising the exposed end thereof in contact with said circuit-completing devices, and a pick-up on the car for actuating said mechanism.

6. The combination, in an electrical railway, of a conductor insulated and protected at all points throughout its length and adapted to be raised above the surface of the way, jointed bars C B C, carried by the car, having pick-ups upon the same for raising said conductor in contact with circuit-completing devices carried by said car.

7. The combination, as hereinbefore set forth, of the pivoted bars C B C, composed of a central part $a$ of wood and hinged angle-irons $b$ and carrying pick-ups, all supported from the axles of the car, substantially as set forth, a subterranean conduit thereunder, into which said pick-ups extend, a conductor, and means operated by said pick-ups for raising the same in contact with said angle-irons, substantially as and for the purpose set forth.

8. The combination, as hereinbefore set forth, of a series of pivoted bars carried by a car, with circuit-completing devices thereon and a pick-up at each end, a conduit thereunder, into which said pick-ups extend, an underground conductor insulated at all points, with normally-disconnected branch conductors extending therefrom at intervals along the way, also insulated at all points, and a turnstile extending into the path of said slot, with intermediate mechanism for connecting said branch conductors and putting them in electrical connection with the circuit-completing devices on the car above the level of the way.

9. The combination, in an electrical railway, of an underground conductor insulated at all points throughout its length, branch conductors insulated at every point, extending therefrom at intervals along the way, a device on the car extending into the slot of a conduit, boxes arranged at said branch conductors, a turnstile in one box in the path of the device extending into said conduit-slot, and intermediate mechanism between the same and the cover of the other box, an insulated plate thereon connected with the branch conductor, whereby when the turnstile is operated by the device extending from the car into the slot of the conduit the circuit will be completed to the car and the exposed conductor terminal raised above the level of the way.

10. The combination, in an electrical railway, of an underground conductor insulated at all points, normally-disconnected branch conductors, also insulated at all points, extending therefrom at intervals along the way, having their exposed terminals suitably protected, a device on the car extending into the slot of a conduit, boxes arranged at said branch conductors, a turnstile in one box in the path of the device extending into said conduit-slot, and intermediate mechanism between the same and the cover of the other box and between the latter and the protected terminals, and an insulated plate on said cover in electrical communication with said branch conductors, whereby when the turnstile is operated by the device extending from the car into the slot of the conduit the circuit will be completed between the branch conductors and the plate put in circuit with devices on the car raised above the ground.

11. An electrical railway having a turnstile arranged in boxes at intervals along the way, a conductor insulated at all points throughout, normally-disconnected branch conductors, also insulated at all points at said boxes, having terminals suitably protected, circuit-completing devices carried by a car, a pick-up on said car operating said turnstile to establish electrical communication between said conductors and raise the exposed end of said branch conductors above the level of the way, substantially as described.

12. The combination, in an electrical railway, of a car A, carrying bars C B C, composed of a central part $a$ of wood, with angle-irons $b$ hinged thereto, pick-ups $c$, depending therefrom, a conduit having a slot S, within which the pick-ups work, boxes, as $f$ $g$, arranged at intervals along the way, the former having hinged covers, mechanism connecting the same to a turnstile $h$ in the line of said slot, a conductor $e$, with branches $e'$ and $e^2$ at said boxes, insulated as described, a water-tight drumhead $o$, devices intermediate of said cover and drum operated by said cover when it reaches its highest point, and an insulating-plate $q$ upon said cover, to which the conductor $e^2$ is secured, whereby when the turnstile is operated by said pick-ups the cover will be raised and lowered, the circuit between the conductors made and broken, and contact be made and broken with the angle-irons above the level of the way.

13. The combination, in an electrical railway, of an insulated conductor, branch conductors at intervals along the way, a pick-up carried by a car adapted to raise the exposed end of said branch conductors in contact with circuit-conveying devices upon said car, and a guide-slot for said pick-up arranged parallel with the track.

In testimony whereof I have hereunto set my hand and seal, this 10th day of June, 1887, in the presence of two subscribing witnesses.

FRANK MANSFIELD. [L. S.]

Witnesses:
  A. C. FOWLER,
  CHAS. D. FOWLER.